H. R. PALMER.
DRY CELL BATTERY.
APPLICATION FILED FEB. 8, 1918.

1,286,750.

Patented Dec. 3, 1918.

Inventor
HERBERT R. PALMER
By Amos P. Griswold
Atty.

UNITED STATES PATENT OFFICE.

HERBERT R. PALMER, OF CLEVELAND HEIGHTS, OHIO.

DRY-CELL BATTERY.

1,286,750.

Specification of Letters Patent.

Patented Dec. 3, 1918.

Application filed February 8, 1918. Serial No. 216,041.

*To all whom it may concern:*

Be it known that I, HERBERT R. PALMER, a citizen of the United States, residing at Cleveland Heights, in the county of Cuyahoga and State of Ohio, have invented certain new and useful Improvements in Dry-Cell Batteries, of which the following is a specification.

This invention relates to the construction of dry-cell batteries of the Leclanché type, in which the life or durability of electric discharge depends primarily upon the depolarizing or hydrogen absorbing action of the manganese dioxid in close contact with a medium which separates the active element of the cell from the depolarizing medium.

The invention consists in improved modifications which are the result of experiments made by me while developing certain dry cell batteries invented by me, one of which is described and claimed in a former application of mine bearing Serial Number 196,829, said application having been allowed December 11, 1917. Another one is Patent No. 1,231,057, June 26, 1917. Inasmuch as this is an improvement on my former inventions, the primary object is the same, said object being to increase the efficiency of a cell of the type set forth, without materially increasing the volume or weight of the cell.

In my former construction I realize the object desired by the employment of one carbon or positive pole and two negative poles comprising zinc strips of sinuous formation peculiarly arranged relative to the carbon element and the depolarizing mixture.

By experimenting in actual practice and comparative tests, I have found that the efficiency of the battery is increased and the cost of manufacture reduced by employing two carbon electrodes and a single anode of sinuous formation, interposed between the carbons. This improved construction reduces the electrical resistance one-half, resulting from the two-fold increased cross-section area of the cathode members. It provides for a reduction of the quantity of anode material, and while it increases the quantity of carbon, the difference in cost of the carbon and the material used in the anodes, combined with the decreased cost of assembling makes a more economical battery.

An important factor of efficiency in a battery of this character, is the perfect insulation of the metallic anode terminals from the depolarizing mixture. The improved construction reduces the chances of imperfection in this feature by the elimination of one anode in each cell, thereby providing for the insulation of one metallic terminal instead of two as in my former construction.

The improved construction further provides for the elimination, on two sides of the cell, of the auxiliary stiffening members, such as boards, asbestos, transite, or fiber. The carbon electrodes perform the function of said members, and while I am aware that this specific feature is not new in the art, it has not heretofore been embodied in a construction including a sinuous anode.

In a comparative test of a battery of the present construction, and one embodying the twin sinuous anodes, a peculiar fact has been demonstrated. By utilizing either one of the twin anodes in connection with the single carbon electrode, about 18 amperes was developed, then by combining the two anodes in connection with the single carbon electrode about 25 amperes was the result. In a battery embodying a single sinuous anode interposed in the mixture between two carbon plates, when one carbon was used in connection with the anode about 18 amperes was the result obtained, but when the two carbons were connected and used in combination with the single sinuous anode 30 amperes was obtained, thereby showing an increased efficiency.

In the accompanying drawing which forms a part of the specification, Figure 1 is a perspective view of an embodiment of the improved cell.

Figure 1:
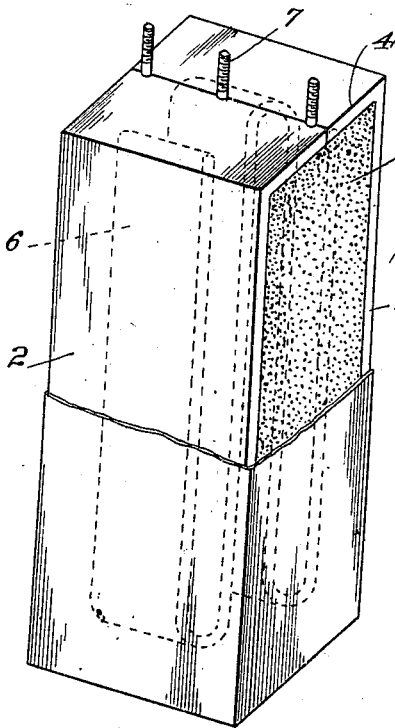
Figure 2:
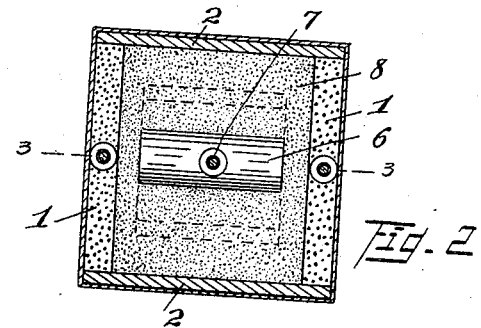
Fig. 2 is a cross-section on line 2—2 of Fig. 3.
Figure 3:
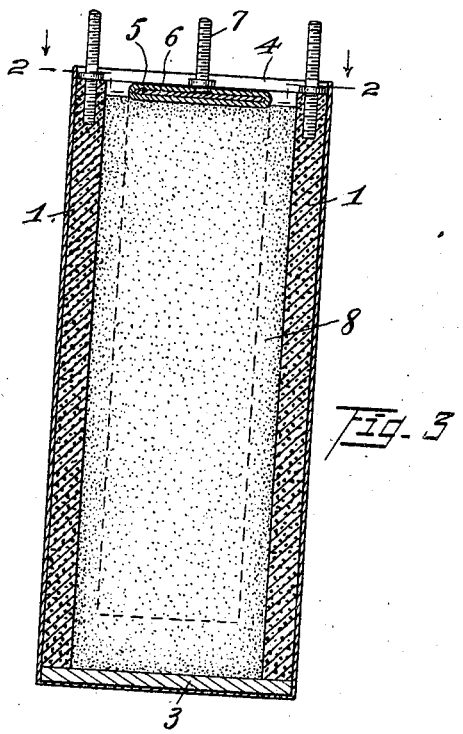
Fig. 3 is a vertical section on line 3—3 of Fig. 2.

Referring now to the drawing, the present embodiment of the improved dry cell includes duplicate flat carbon members 1, which are the cathodes of the cell, and also serve as the stiffening members for two sides of the battery. The other two sides and the ends may be of any suitable material. A desirable construction is illustrated, in which a continuous strip of chipboard soaked in paraffin is employed for the sides 2, the bottom 3 and the top 4.

Figures 4, 5:
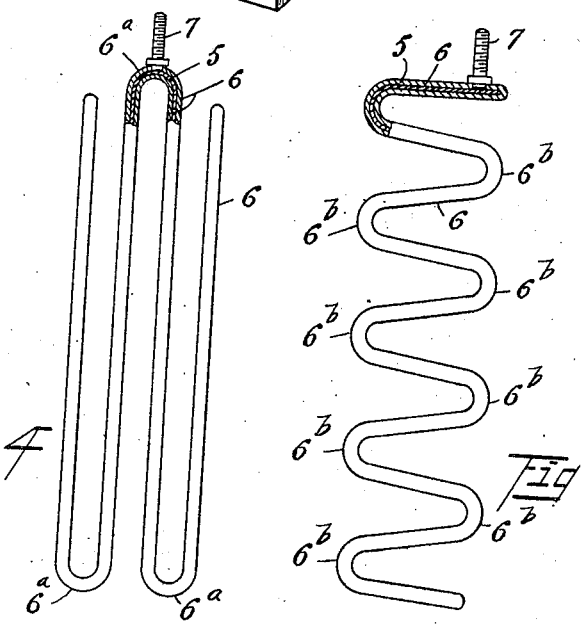
Figs. 4 and 5 illustrate two types of sinuous anodes.

The single anode of the present improved cell is similar to one of the twin anodes used in my former battery above referred to. The said anode is sinuous in formation and may be of the type shown in Fig. 4 or of that illustrated in Fig. 5. In either type the anode comprises a zinc ribbon 5, entirely enveloped in absorbent material 6, and provided with a binding post 7.

A suitable depolarizing mixture 8, preferably containing carbon and manganese dioxid, is packed around and in contact with the leaves of the anode and in contact with the carbon members 1, the edges of the sinuous anode facing the said carbon members, and the flat surfaces of the leaves of said anode being in lateral planes relative to the inner faces of the carbons 1. The sinuous formation of the anode member provides a large area of active element, in proportion to the size of the cell. This is an important feature of the present invention and was the primary feature of my former patent above referred to, but I have found that the present construction enhances the efficiency of the cell as stated in the preamble. It reduces the electrical resistance; decreases the cost of manufacture and increases the assurance of perfection.

Figure 6:
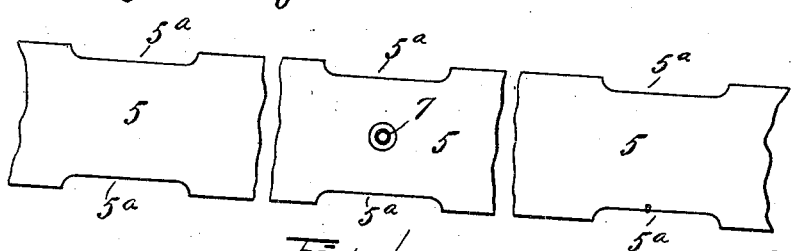
Fig. 6 is a fragmentary view of the zinc or active element of the anode, showing a preferred form of blank before it is bent into sinuous shape.

A preferred form of zinc member 5 is provided with recesses 5$^a$ in the opposite edges as shown in Fig. 6, said recesses occurring in the plane of the bends 6$^a$ or 6$^b$.

What I claim and desire to secure by Letters Patent is.

1. A battery of the character described comprising a plurality of carbon cathodes, an anode of sinuous formation interposed between the cathodes, and depolarizing mixture packed around the anode in contact with said anode and the cathodes.

2. A battery of the character described comprising a plurality of carbon cathodes which form sides of a container, an anode of sinuous formation interposed between the cathodes, and depolarizing mixture packed in the container around the anode in contact with said anode and the cathodes.

3. A battery of the character described comprising a closed container, an anode consisting of a strip of active material sinuous in formation thereby forming a continuous series of opposing members, an envelop of absorbent material surrounding said sinuous strip, electrodes on opposite sides of said anode, and depolarizing mixture packed in said container around the anode and in contact with said anode and the cathodes.

4. A battery of the character described comprising a closed container, an anode consisting of a series of connecting leaves of active material enveloped in absorbent material, electrodes on opposite sides of said anode, said electrodes forming sides of the container, the edges of the anode facing the electrodes, the leaves of said anode being in transverse planes relative to said electrodes, and depolarizing mixture packed in the container around the anode in contact with said anode and the cathodes.

In testimony whereof I affix my signature.

HERBERT R. PALMER.